United States Patent
Karlquist

(10) Patent No.: US 7,245,683 B2
(45) Date of Patent: Jul. 17, 2007

(54) SYSTEM AND METHODS OF RECOVERING A CLOCK FROM NRZ DATA

(75) Inventor: Richard K. Karlquist, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 775 days.

(21) Appl. No.: 10/411,996

(22) Filed: Apr. 11, 2003

(65) Prior Publication Data

US 2004/0202267 A1 Oct. 14, 2004

(51) Int. Cl.
*H04L 7/02* (2006.01)
(52) U.S. Cl. ...................................... 375/359
(58) Field of Classification Search ................ 375/291, 375/359, 277, 259, 260; 398/155
See application file for complete search history.

(56) References Cited

U.S. PATENT DOCUMENTS

| | | | |
|---|---|---|---|
| 4,929,849 A * | 5/1990 | Paul .......................... | 327/155 |
| 5,164,966 A * | 11/1992 | Hershberger ................ | 375/359 |
| 5,589,683 A | 12/1996 | Nakai | |
| 5,671,258 A * | 9/1997 | Burns et al. ................ | 375/359 |
| 6,574,022 B2 | 6/2003 | Chow et al. | |
| 7,072,408 B2 * | 7/2006 | Gehlot et al. ............... | 375/259 |
| 2001/0027091 A1 | 10/2001 | Kimishima | |
| 2003/0056157 A1 | 3/2003 | Fala et al. | |
| 2003/0063698 A1 * | 4/2003 | Bonthron et al. ........... | 375/359 |
| 2004/0202481 A1 * | 10/2004 | Karlquist .................... | 398/155 |

OTHER PUBLICATIONS

Yoo et al. , A Novel Clock Extraction Circuit Using A New NRZ-to-PRZ Converter And A Dielectric Resonator Filter For 10 Gbits/s Optical Receiver, May 16-20, 1995, Microwave Symposium Digest, 1995, IEEE MTT-S International, vol. 3, pp. 1395-1398. □□.*
U.S. Appl. No. 10/412,374, filed Apr. 11, 2003, Richard K. Karlquist.

* cited by examiner

*Primary Examiner*—Emmanuel Bayard
*Assistant Examiner*—Lawrence Williams

(57) ABSTRACT

A substantially passive implementation of a clock recovery circuit may be employed to reduce or eliminate the amount of jitter added to the recovered clock by the recovery circuitry. NRZ data may be received in differential form (i.e., a separate NRZ signal and an inverted NRZ signal are received). The inverted NRZ data may be delayed by one-half of a unit interval with respect to the NRZ data by a delay element. The NRZ data and the delayed NRZ data may be combined by a broadband combiner (e.g., a resistive adder). The combined signal may be split into two signals. The two split signals may be rectified by suitable components. One of the limited split signals may be subtracted from the other limited split signal to generate an output signal. The generated output signal then possesses a spectral component at a clock frequency of the NRZ data.

20 Claims, 2 Drawing Sheets

SYSTEM AND METHODS OF RECOVERING A CLOCK FROM NRZ DATA

CROSS-REFERENCE TO RELATED APPLICATIONS

This application is related to concurrently filed and commonly assigned U.S. patent application Ser. No. 10/412,374, entitled "SYSTEMS AND METHODS FOR RECOVERING A CLOCK FROM OPTICAL DATA," which is incorporated herein by reference.

TECHNICAL FIELD

The present invention is directed to recovery of an embedded clock from a data stream and, more particularly, to systems and methods for recovery of an embedded clock utilizing passive circuitry.

BACKGROUND

Non-return-to-zero (NRZ) signaling refers to an encoding scheme in which there is no return to a reference voltage between encoded bits. Instead, the signaling remains at a "high" voltage for consecutive "ones" and remains at a "low" voltage for consecutive "zeros." Additionally, NRZ communication systems embed the clock in the data. Thus, in data transmission systems that utilize NRZ signaling, it is necessary to recover the clock based on the timing of the data transitions in a data stream.

A commonly utilized method for recovering the embedded clock is to implement a circuit that generates an impulse whenever there is a data transition. Circuit 100 of FIG. 1 implements this common method. Circuit 100 receives data at splitter 101. Splitter 101 provides two separate circuit paths to exclusive-OR (XOR) gate 103. In one of the circuit paths, delay element 102 provides a one-half unit interval (UI) delay, where the "unit interval" is defined as the time elapsed during one bit or symbol. By delaying the data provided to XOR gate 103, circuit 100 will produce a pulse whenever there is a data transition (from "zero" to "one" or vice versa). The pulses will contain a spectral component at the clock frequency that can be filtered by band-pass filter 104 to recover the embedded clock. Circuit 100 is associated with a number of disadvantages. First, circuit 100 requires logic technology that can switch in less time than one-half of a unit interval. Secondly, XOR gate 103 and an optional preceding limiter (not shown) may add jitter to the recovered clock.

The use of a clock recovery circuit that adds jitter to the recovered clock can be problematic for a number of applications. Specifically, most data transmission systems impose a performance criteria for jitter. In order to make a jitter measurement for a data transmission system to verify the performance of the system, the clock is first recovered from communicated data and, then, the jitter of the recovered clock is measured using conventional jitter measurement techniques. If the clock recovery circuit adds jitter, then there is an error floor imposed on any jitter measurements that utilize the clock recovery circuit.

BRIEF SUMMARY

In representative embodiments, a substantially passive implementation of a clock recovery circuit may be employed to reduce or eliminate the amount of jitter added to the recovered clock by the recovery circuitry. According to representative embodiments, NRZ data may be received in differential form (i.e., an NRZ signal and a separate inverted NRZ signal are received). If the NRZ is not received in differential form, a differential amplifier may be employed. The inverted NRZ data may be delayed by one-half of a unit interval with respect to the NRZ data by a delay element. The NRZ data and the delayed NRZ data may be combined by a broadband combiner (e.g., a resistive adder) thereby producing a three-level (ternary) waveform. The combined signal may be split into two signals. The two split signals may be rectified by suitable components. One of the limited split signals may be subtracted from the other limited split signal to generate an output signal. The generated output signal then possesses a spectral component at a clock frequency of the NRZ data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
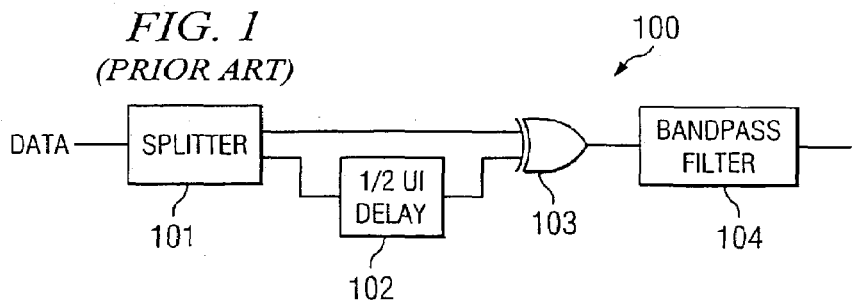
FIG. 1 depicts a clock recovery circuit according to the prior art.
Figure 2:
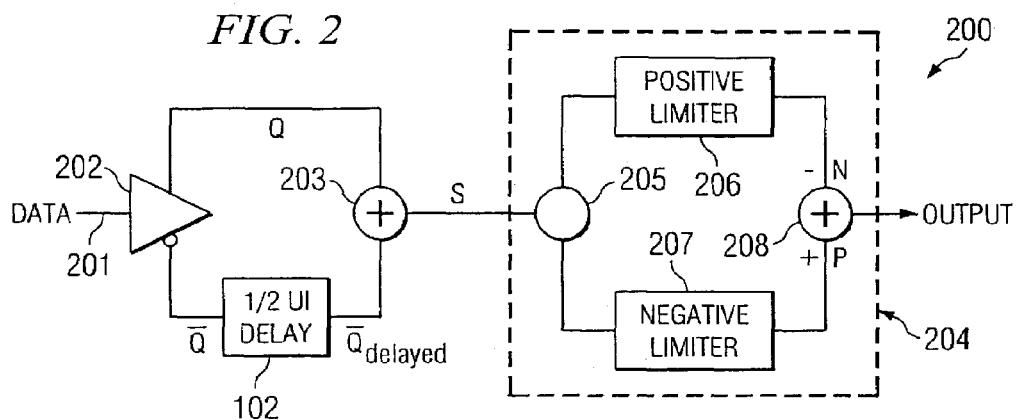
FIG. 2 depicts a clock recovery circuit according to representative embodiments.

FIG. 2 depicts system 200 for recovering an embedded clock from a data stream according to representative embodiments. System 200 processes data 201 in differential form. If data 201 is not available in differential form, differential amplifier 202 may be utilized. Since differential amplifier 202 is an active component, all of system 200 is not necessarily passive. After differential amplifier 202, data 201 proceeds on two separate circuit paths. In one path, the data (denoted by Q) proceeds unchanged. In the other path, an inverted version (denoted by $\overline{Q}$) of the data propagates. Also, in the other path, the inverted version is delayed by one-half of a unit interval by delay element 102. The data (Q) and the delayed inverted version of the data (denoted by $\overline{Q}_{delayed}$) are combined by broadband linear combiner 203. In representative embodiments, broadband linear combiner 203 may be implemented as a resistive adder.

By splitting and processing data 201 in this manner, a pulse will occur after broadband linear combiner 203 every time that a data transition occurs. However, the pulses will occur with alternating polarity. The number of positive pulses must match the number of negative pulses (due to the mathematics of the application) and, thus, the spectral component at the clock frequency generated by the pulses of one polarity cancel the spectral component at the clock frequency generated by the pulses of the other polarity. Accordingly, rectifying block 204 rectifies the output (denoted by S) of broadband linear combiner 203. Rectifying block 204 may be implemented in a number of ways. For example, rectifying block 204 may be implemented utilizing Schottky diode circuits.

As shown in FIG. 2, rectifying block 204 comprises resistive splitter 205 to provide two separate circuit paths. In one circuit path, positive limiter 206 (whose output is denoted by N) is employed to clip at greater than 1V. In the other circuit path, negative limiter 207 (whose output is denoted by P) clips at less than 1V. Positive limiter 206 and negative limiter 207 may be implemented utilizing, for example, Schottky diodes. Combiner 208 subtracts the output of positive limiter 206 from the output of negative limiter 207 or, equivalently, sums the output of negative limiter 207 and an inverted version of the output of positive limiter 206. Combiner 208 may be implemented as a narrowband combiner operable near the clock frequency if desired. The output of combiner 208 exhibits a positive pulse every time a data transition occurs in data 201. By filtering the output of combiner 208, the embedded clock in data 201 may be recovered.

Figure 3:
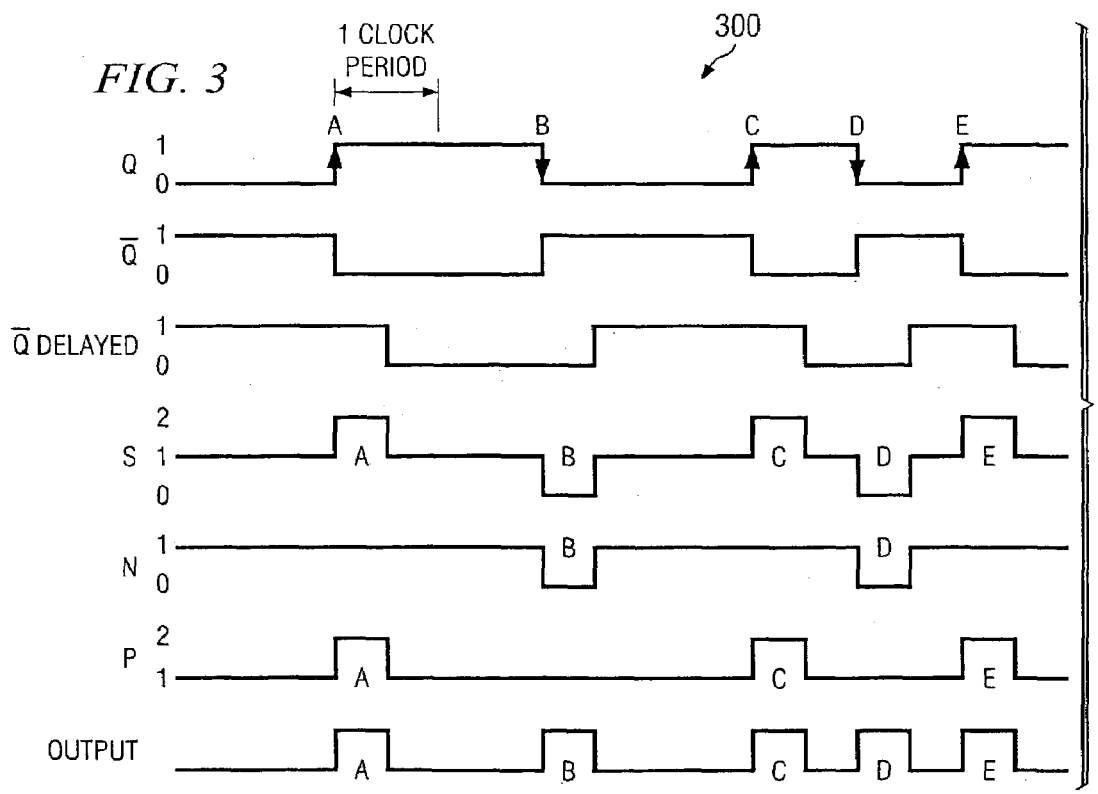
FIG. 3 depicts timing diagrams of signals generated by the clock recovery circuit shown in FIG. 2 according to representative embodiments.

For the convenience of the reader, FIG. 3 depicts timing diagram 300 to illustrate the operation of system 200 according to representative embodiments. First, the unit interval or the clock period is shown. Data 201 (denoted by Q) is shown. Data 201 is communicated as NRZ data. Data 201 comprises data transitions A, B, C, D, and E that are associated with the signal transitioning from "zero" to "one" or from "one" to "zero." The inverted version of data 201 is shown in the diagram denoted by $\overline{Q}$. The delayed inverted version of data 201 is shown in the diagram denoted by $\overline{Q}_{delayed}$.

The summation of data 201 with the delayed inverted version of data 201 is shown in the timing diagram denoted by S. The summation causes the combined signal to range from 0.0V to 2V (assuming that data 201 ranges from 0.0V to 1V, although any suitable voltage levels may be utilized). The combined signal produces a pulse of one-half of a unit interval for each data transition. Specifically, a positive pulse (e.g., a voltage at 2V) is generated at data transition A, C, and E and a negative pulse (e.g., a voltage at 0.0V) is generated at data transitions B and D. When no data transition occurs, the voltage remains at 1V.

The output of the negative limiter 207 is shown in the timing diagram and is denoted by P. The output of negative limiter 207 includes positive pulses at data transitions A, C, and E. The output of positive limiter 208 is shown in the timing diagram and is denoted by N. The output of positive limiter 208 includes negative pulses at data transitions B and D. By subtracting the output of positive limiter 208 from the output of negative limiter 207, the output of combiner 209 possess a positive pulse at each of data transitions A, B, C, D, and E. The output signal may be filtered to recover the clock associated with the NRZ data.

Figure 4:
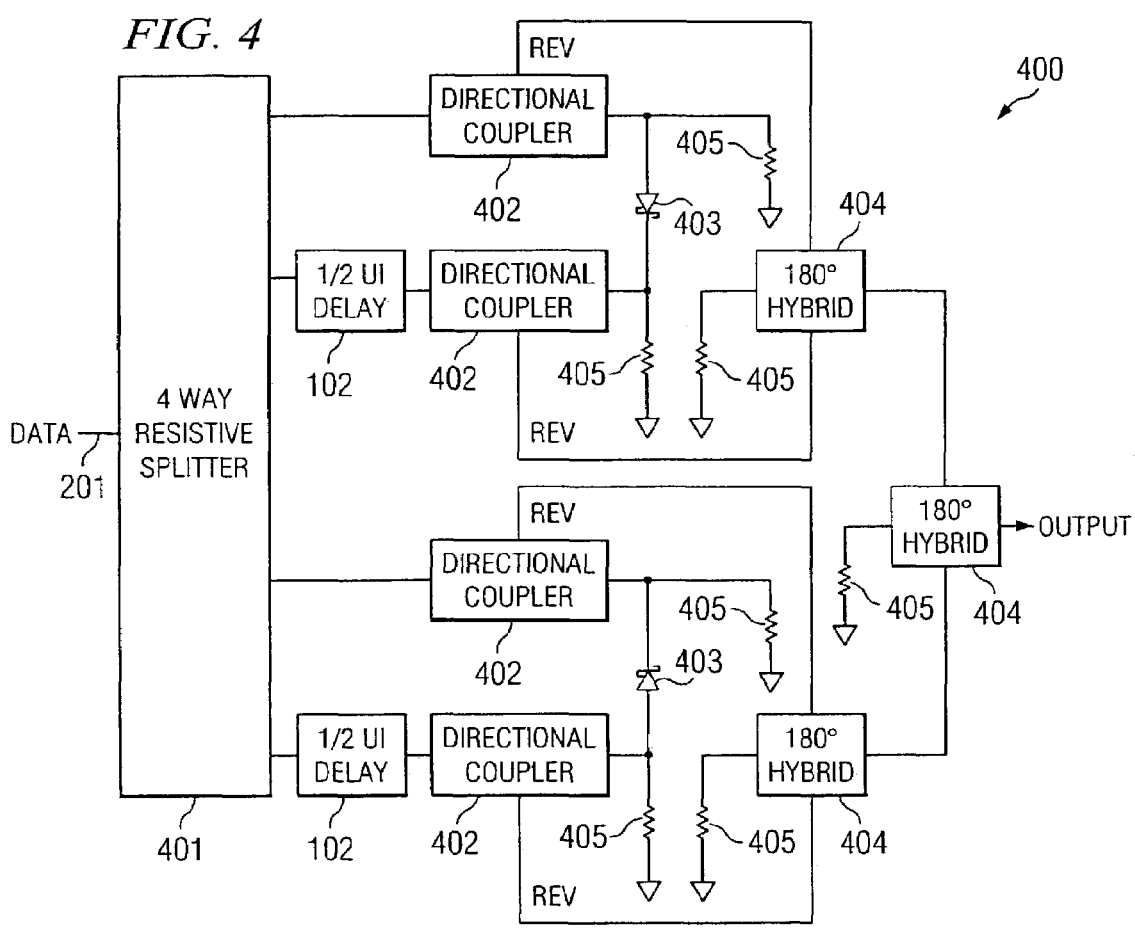
FIG. 4 depicts another clock recovery circuit according to representative embodiments.

FIG. 4 depicts system 400 that eliminates the necessity of having the input data in differential form according to representative embodiments. In system 400, data 201 is provided to 4-way resistive splitter 401 that generates four in-phase signals. One pair of the split signals are processed for positive transitions and the other pair is used for negative transitions. The positive and negative transitions are processed by complementary delay elements 102, direction couplers 402, and diodes 403.

For each pair of split signals, one of the pair is delayed by ½ UI by delay element 102 before provision to a respective directional coupler 402. Directional couplers 402 are terminated appropriate to their characteristic impedance; additionally, a respective diode 403 (e.g., a Schottky diode) is connected so as to bridge termination resistors 405. Directional couplers 402 allow current to flow from 4-way resistive splitter 401 or delay element 102 to the respective lines coupled to diode 403 and prevent current from flowing in the opposite direction.

When no transition occurs in data 201, both lines from directional couplers 402 are either high or low and, hence, there is no voltage across the respective diode 403. This occurs for both diodes 403. When no transition occurs, diodes 403 are off and there is no reflection from the termination. Thus, the reverse ports of directional couplers 402 have no output of system 400 remains low.

When a data transition occurs, one of diodes 403 will conduct for one-half of a unit interval and the other diode 403 will be reverse biased and remain off. Specifically, the data transition causes a mismatch between the lines coupled from directional couplers 402 to the respective diode 403. The mismatch results in a reflection from the respective diode 403. The reflection from the respective diode 403 causes current to flow from the reverse ports of directional couplers 402. The output of the reverse ports of directional couplers 402 are combined by respective 180° hybrid couplers 404. Another 180° hybrid coupler 404 is employed to ensure that the output of system 400 only produces a pulse of the same polarity when a data transition occurs. The output signal from the last 180° hybrid coupler 404 possesses a spectral component at the frequency of the clock embedded in the NRZ data. The output signal may be filtered to recover the clock.

System 400 provides several advantages. Specifically, the implementation of system 400 does not require undue complexity. The components of system 400 are available as standard commercially-available microwave components. Additionally, the components are passive and, hence, do not add jitter to the recovered clock. An amplifier (not shown) may be added to address splitting loss if appropriate for a particular application. Since the amplifier is an active component, it may add a degree of jitter to the clock. Alternatively, diodes 403 may be biaesed to address splitting loss.

The recovery of the embedded clock from NRZ data using representative embodiments is advantageous for several reasons. First, the substantially passive implementation of circuit elements of representative embodiments cause relatively little jitter to be added to the recovered clock. Moreover, representative embodiments are not appreciably restricted by the switching limitation of logical gates. Specifically, representative embodiments do not require an XOR gate and, hence, are not constrained to the clock rate supported by available logic technology.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for recovering a clock from non-return-to-zero (NRZ) data, comprising:
   a first combiner that combines said NRZ data and an inverted version of said NRZ data that is delayed with respect to said NRZ data;
   a splitter for splitting an output signal from said first combiner into a first split signal and a second split signal;
   a positive limiter for limiting said first split signal;
   a negative limiter for limiting said second split signal; and
   a second combiner that combines said limited first split signal and said second split signal to generate an output signal that possesses a spectral component at a clock frequency of said NRZ data.

2. The system of claim 1 further comprising:
   a differential amplifier that receives said NRZ data to generate said inverted version of said NRZ data.

3. The system of claim 2 further comprising:
   a delay element that delays said inverted NRZ data by one-half of a unit interval.

4. The system of claim 1 wherein said first combiner is a resistive adder.

5. The system of claim 1 wherein said positive limiter and said negative limiter are implemented utilizing Schottky diodes.

6. The system of claim 1 wherein said second combiner that combines said limited first split signal and said second split signal is a narrowband combiner.

7. The method of claim 1 wherein said second combiner subtracts said limited first signal from said limited second signal to generate said output signal.

8. A method for recovering a clock from non-return-to-zero (NRZ) data, comprising:
   combining said NRZ data and an inverted version of said NRZ data that is delayed with respect to said NRZ data to generate a combined signal;
   splitting said combined signal into a first split signal and a second split signal;
   clipping said first split signal according to a first threshold;
   clipping said second split signal according to a second threshold; and
   combining the clipped first split signal and the clipped second split signal to generate an output signal that possesses a spectral component at a clock frequency of said NRZ data.

9. The method of claim 8 further comprising:
   differentially amplifying said NRZ data to generate said inverted version of said NRZ data.

10. The method of claim 9 further comprising:
    delaying said inverted NRZ data by one-half of a unit interval.

11. The method of claim 8 wherein said combining said NRZ data and an inverted version of said NRZ data is performed by a resistive adder.

12. The method of claim 8 wherein said clipping said first split signal and said clipping said second split signal are performed by Schottky diodes.

13. The method of claim 8 wherein combining said clipped first split signal and said clipped second split signal is performed by a narrowband combiner.

14. The method of claim 8 wherein said combining said clipped first split signal and said clipped second split signal subtracts said clipped first split signal from said clipped second split signal.

15. A system for recovering a clock from non-return-to-zero (NRZ) data, comprising:
    a first diode;
    a first directional coupler that receives said NRZ data and is coupled to a first side of said first diode and to a termination resistor appropriate to its characteristic impedance;
    a second directional coupler that receives a delayed version of said NRZ data and is coupled to a second side of said first diode and to a termination resistor appropriate to its characteristic impedance;
    a second diode;
    a third directional coupler that receives said NRZ data and is coupled to a first side of said second diode and to a termination resistor appropriate to its characteristic impedance;
    a fourth directional coupler that receives a delayed version of said NRZ data and is coupled to a second side of said second diode and to a termination resistor appropriate to its characteristic impedance; and
    combining structure for combining outputs from reverse ports of said first, second, third, and fourth direction couplers to generate an output signal that possesses a spectral component at a clock frequency of said NRZ data.

16. The system of claim 15 wherein said combining structure includes a first 180° hybrid coupler coupled to said first and second directional couplers, a second 180° hybrid coupler coupled to said third and fourth directional couplers, and a third 180° hybrid coupler coupled to said first and second 180° hybrid couplers.

17. The system of claim 15 further comprising:
    a resistive splitter that splits said NRZ data into four split signals.

18. The system of claim 17 further comprising:
    a first delay element that is coupled to said second directional coupler for delaying one of said four split signals; and
    a second delay element that is coupled to said fourth directional coupler for delaying another one of said four split signals.

19. The system of claim 15 wherein said first and second diodes are Schottky diodes.

20. The system of claim 15 wherein said first and second diodes are biased.

* * * * *